United States Patent
Coudray et al.

(10) Patent No.: US 6,299,280 B1
(45) Date of Patent: Oct. 9, 2001

(54) METHOD OF TRANSMITTING INFORMATION BY CAPACITIVE CONNECTION AND A DEVICE ADAPTED TO IMPLEMENT IT, SUCH AS A PRINTER

(75) Inventors: Pascal Coudray, Melesse; Marie-Hélène Froger, Chateaugiron, both of (FR)

(73) Assignee: Canon Research Centre France S.A. (FR)

( * ) Notice: Subject to any disclaimer, the term of this patent is extended or adjusted under 35 U.S.C. 154(b) by 0 days.

(21) Appl. No.: 09/305,445

(22) Filed: May 6, 1999

(30) Foreign Application Priority Data

May 18, 1998 (FR) .................................................. 98 06231

(51) Int. Cl.[7] .................................................. B41J 23/00
(52) U.S. Cl. .............................................................. 347/37
(58) Field of Search ................................ 347/37, 10, 11, 347/23; 346/139 R (56) References Cited

U.S. PATENT DOCUMENTS

| | | | |
|---|---|---|---|
| 4,390,877 | * 6/1983 | Curran | 340/825.72 |
| 4,522,517 | 6/1985 | Wade et al. | 400/322 |
| 4,876,535 | 10/1989 | Ballmer et al. | 340/825 |
| 5,461,705 | 10/1995 | Wakabayashi et al. | 395/115 |

FOREIGN PATENT DOCUMENTS

| | | |
|---|---|---|
| 40 17 934 A1 | 6/1980 | (DE) . |
| 0184816 | 6/1986 | (EP) . |
| 0642925 | 3/1995 | (EP) . |
| 78 34092 | 12/1978 | (FR) . |

* cited by examiner

*Primary Examiner*—N. Le
*Assistant Examiner*—Shih-wen Hsieh
(74) *Attorney, Agent, or Firm*—Fitzpatrick, Cella, Harper & Scinto (57) ABSTRACT

An apparatus for transmitting binary information between a first device carried by a first body and a second device carried by a second body, movable with respect to the first body along a path within a given range of movement, includes at least one first electrically conductive main plate on the first body along the path of the second body and a second electrically conductive main plate on the second body. The first and second main plates remain opposite each other, at a constant distance from each other, when there is a relative movement of the second body with respect to the first body within the range of movement along the path, such that the first and second main plates form a main capacitor with a constant capacitance. Transmission of information from one of the first and second devices to the other occurs by coding the information into at least one binary coded signal, transmitting the coded signal by applying the coded signal to one of the first and second main plates of the main capacitor, collecting a received signal at the other of the first and second main plates of the main capacitor, and decoding the received signal.

29 Claims, 4 Drawing Sheets

METHOD OF TRANSMITTING INFORMATION BY CAPACITIVE CONNECTION AND A DEVICE ADAPTED TO IMPLEMENT IT, SUCH AS A PRINTER

The invention concerns the transmission of information between two elements movable with respect to each other along a path; it relates in particular but not exclusively to the transmission of information between the control for a print head and the latter within a printing device, and/or vice versa. In practice, such a printing is effected on paper, but can also be effected on any other medium, notably textile (for example in roll form), plastic materials, etc.

In printing devices using inkjet technology, the ink cartridge and its print head are mounted on a reciprocating carriage actuated by a motor. This movement takes place over the entire width of the sheet.

In order to transmit the digital information necessary for the correct functioning of the print head, a flexible cable provides an electrical connection between the central unit of the printing device and its print head.

This cable must meet a certain number of mechanical constraints. It must be sufficiently flexible to be able not to interfere with the movement of the carriage and in particular long enough to be able to move the carriage over the entire length of the printing medium.

It should be noted that ink-jet technology is used for printing documents whose size can range up to A0 format.

This type of electrical connection has a certain number of defects.

The first is related to the length of the cable, which is greater, the longer the printing medium. This has a direct effect on the cost of this cable.

The need to have qualities of resistance to deflection for this long cable also increases the cost of the device.

Another method of transmitting information between the processing unit and the print head consist of using a means of optical transmission of the data to the carriage. This is described notably in the document EP-94306138, which proposes a printer provided with an optical transmission link for the transmission of data between the device controlling the printer and its print head mounted on a reciprocating carriage. The print data are conveyed from the control to the head, passing through a fixed point on the edge of the carriage, and the status data can be conveyed in the reverse direction. In addition, power is supplied to the head by two parallel rails on which the carriage is supported in order to be moved in a reciprocating motion by the motor driving the carriage mounted on the chassis. This carriage is provided with conductive lugs in sliding contact with these rails. The information is in practice transmitted by an infrared light beam.

This type of connection has a certain number of defects.

The first is related to the cost of the optical links. The components used for this type of link are relatively expensive, in particular when the information transmission rates are of the order of several hundreds of kilobits per second.

In addition, the use of ink-jet technology for color printing requires transmission rates of the order of megabits per second.

However, transmission of information optically can take place only through a single optical link. It is difficult in fact to produce optical links in parallel. These interfere with each other.

The field of application of the optical method for the transmission of printing data is therefore limited.

In fact this type of problem is found in other applications where information is to be transmitted from a first body to a second body movable with respect to the first, without it being wished to use a flexible connecting cable.

The invention aims to mitigate the aforementioned drawbacks, by virtue of a mode of transmitting information which does not require a flexible cable between the chassis of the printer and the carriage, while guaranteeing good reliability, at moderate cost and with a significant transmission rate, affording in this regard a parallel transmission of several streams of information.

In general terms the invention proposes to proceed by means of a capacitive transmission, through at least one capacitor formed by two plates fixed respectively to two bodies in relative movement and which remain opposite each other, at a constant distance, during this relative movement, so that the said capacitor has a substantially constant capacitance.

It should be noted that one of these plates must in practice have a size at least equal to the relative movement between the bodies; in addition, accurately maintaining the capacitance of the capacitor entirely within the relative movement between the bodies assumes very precise control of the separation between the plates, which a priori appears all the more difficult, the greater the movement. It has however been found that the quality of the guidance which can be obtained during the movement of a body, such as a printing carriage, with respect to another body, such as the chassis of a printing machine, and the accuracy with which plates or tracks along a path between bodies could be produced, such as the aforementioned ones, were sufficient to obtain a substantially constant capacitance.

It could also be feared that the presence of large plates would have the drawback of collecting numerous parasitic signals, liable to interfere with the transmission of information to an unacceptable degree. Tests showed however that this risk was in reality much lower than might be imagined.

More precisely the invention proposes a method of transmitting digital information between a first device carried by a first body and a second device carried by a second body movable with respect to the said first body along a path within a given range of movement, according to which:

at least one first electrically conductive main plate is disposed on the first body and a second electrically conductive main plate is disposed on the second body so that these main plates remain opposite each other, at a constant distance from each other, when there is a relative movement of the second body with respect to the first body within its range of movement along the path and thus constitute a main capacitor with a constant capacitance;

and, in order to transmit information from one of the devices to the other, this information is coded into at least one binary coded signal, this coded signal is applied to the main capacitor, the signal received is decoded and the decoded received signal is transmitted to the other device.

Naturally the transmission is effected notably from the fixed device (in practice the first device) to the movable device (in practice the second device).

There may be several main capacitors, intended to allow the transmission of several information flows in parallel.

There may also be secondary capacitors, to allow the transmission of secondary information or other signals. Thus, advantageously:

a first electrically conductive secondary plate is disposed on the first body and a second electrically conductive secondary plate is disposed on the second body so that these secondary plates remain opposite each other, at a constant distance from each other, when there is a relative movement of the second body with respect to the first body within its range of movement along the path and thus constitute a secondary capacitor with a constant capacitance; and by means of this secondary capacitor at least one other information signal is transmitted from one of the devices to the other.

This other item of information can be a reference concerning the coding, intended to afford effective decoding. This may be the indication of a coding frequency, and the indication of the transition times during this coding: thus, in a preferred fashion, by means of this secondary capacitor a clock signal with a frequency advantageously included within the passband of the said secondary capacitor is transmitted. This clock frequency is for example around 1 to 10 Mhz.

The main and secondary capacitors can have different capacitances. However, they advantageously have substantially equal capacitances, which makes it possible to transmit signals with similar characteristics by means of them. This is why, preferably, the main capacitor is designed so that its passband contains the frequency of the clock signal, and this clock signal is used for coding the information (for example by multiplying the digital information signal by the clock signal) into a binary coded signal and for decoding the signal received. The coded signal will therefore be in the passband of the main capacitor. The main capacitor (and the secondary capacitor if such exists) have for example a capacitance of around 1 pF to 10 pF.

Preferably, the information is coded according to a coding of the Manchester type.

The invention is particularly intended to be implemented in the office machinery field, notably in printing machines. Thus, in a particularly advantageous fashion, the first device and the first main plate are disposed on the chassis of a printing machine provided with a movable print head, the said first device being connected to the device controlling the said head, the second device and the second main plate are disposed on the carriage of the said printing machine, the said second device being connected to the print head, the coding is applied to printing information sent by the control device and the decoded signal received is transmitted to the print head.

In fact, in a printing machine, the first device can be the control circuit for the print head, while the second device can be the print head itself.

Preferably, as an alternative or in addition, the coding is applied to information sent by the print head to the control device, for example through the same main capacitor (in which case there is bidirectional transmission through one and the same capacitor) provided that there are coding means and decoding means on each side of the said capacitor.

The invention also proposes a device adapted to the implementation of the aforementioned method.

It thus proposes a mechanical device having a first body, a second body movable with respect to the said first body along a path within a given range of movement, and a device for transmitting binary information having:

a first electrical device carried by the first body and a second electrical device carried by the second body;

at least one first electrically conductive main plate carried by the first body and connected to the first device, and a second electrically conductive main plate connected to the second device and carried by the second body so that these main plates remain opposite each other, at a constant distance from each other, when there is a relative movement of the second body with respect to the first body within its range of movement along the path and thus constitute a main capacitor with a constant capacitance;

coding means connected to one of the devices in order to code information sent by this device into at least one binary coded signal, and decoding means connected to the other device in order to decode the signal received, the said main capacitor being connected between the said coding means and the said decoding means.

By analogy with that which was disclosed with regard to the method, this device may have various additional characteristics, optionally combined.

The coding means are preferably connected to the first device and the decoding means are connected to the second device.

Advantageously this device also has:

a first electrically conductive secondary plate carried by the first body and a second electrically conductive secondary plate carried by the second body so that these secondary plates remain opposite each other, at a constant distance from each other, when there is a relative movement of the second body with respect to the first body within its range of movement along the path and thus constitute a secondary capacitor with a constant capacitance; and means connecting the said secondary capacitor, on the one hand to an information generator carried by one of the bodies and on the other hand to a user element carried by the other body.

Preferably, the said secondary capacitor is connected to a clock with a frequency lying within the passband of the said secondary capacitor.

The main capacitor and the secondary capacitor preferably have substantially equal capacitances.

Preferably the main capacitor is designed so that its passband contains the frequency of the clock, and the said clock is connected to the coding means and, by means of the secondary capacitor, to the decoding means.

The coding means and the decoding means are for example designed so as to code according to a coding of the Manchester type.

In a particularly advantageous fashion the first device and the first main plate are fixed to the chassis of a printing machine provided with a movable print head, the said first device being connected to the device controlling the said head, the second device and the second main plate are fixed to the carriage of the said printing machine, the said second device being connected to the print head, the coding means being connected to the control device and the decoding means being connected to the print head.

Preferably this device also has coding means connected to the print head and decoding means connected to the control device, the said coding means and the said decoding means being connected together by the said main capacitor.

The invention also covers such a printing machine as it stands.

Objects, characteristics and advantages of the invention will emerge from the following description, given by way of non-limitative example, with regard to the accompanying drawings in which.

Figure 1:
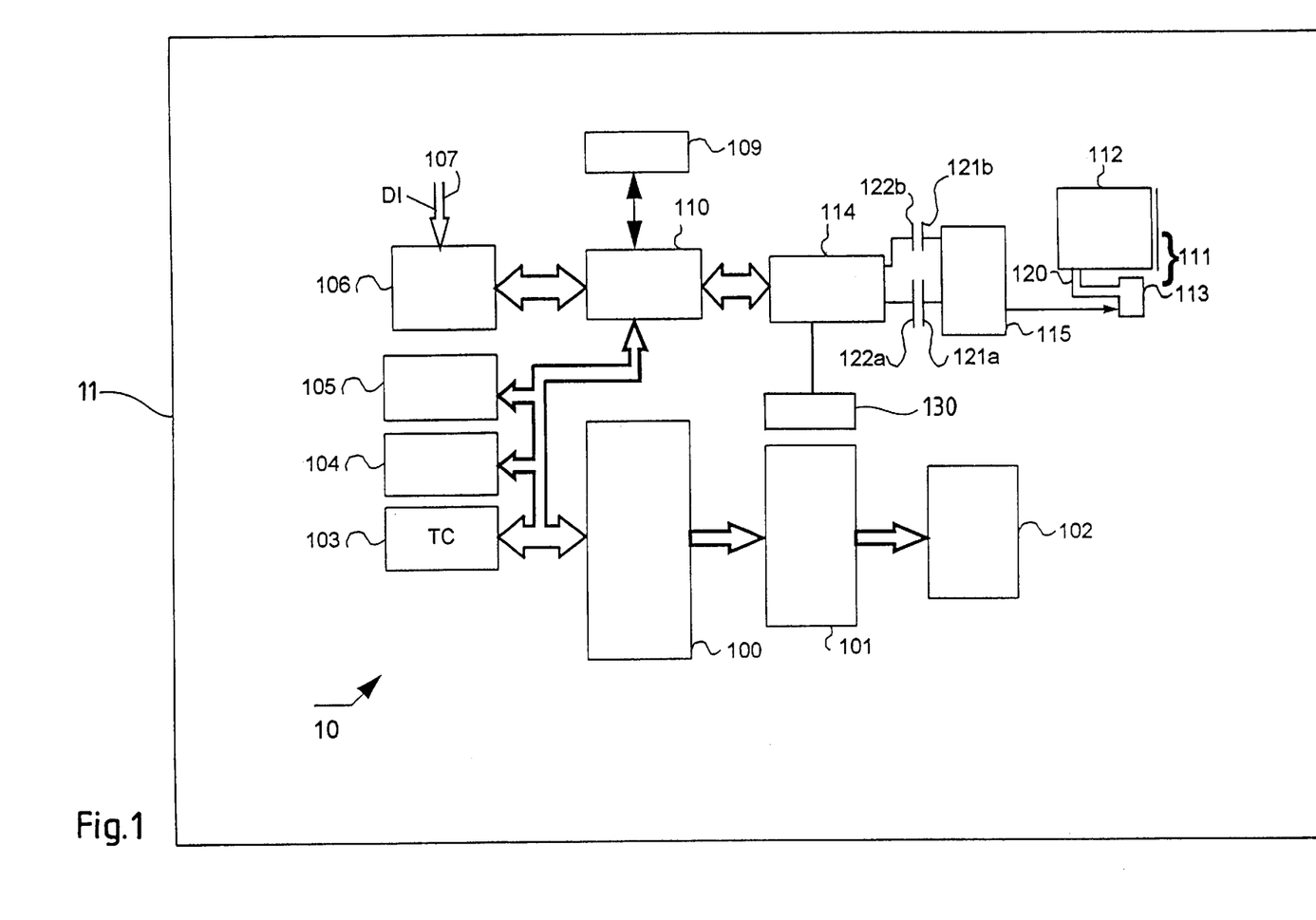
FIG. 1 is a block diagram of a printing device according to the invention.

The invention applies to an image transfer device 10, for example included in a printer 11, which receives data to be printed DI by means of a parallel input/output port 107 connected to an interface circuit 106. The circuit 106 is connected to an ink ejection control circuit 110 which controls a cartridge 111, via an amplification circuit 114.

Figure 2:
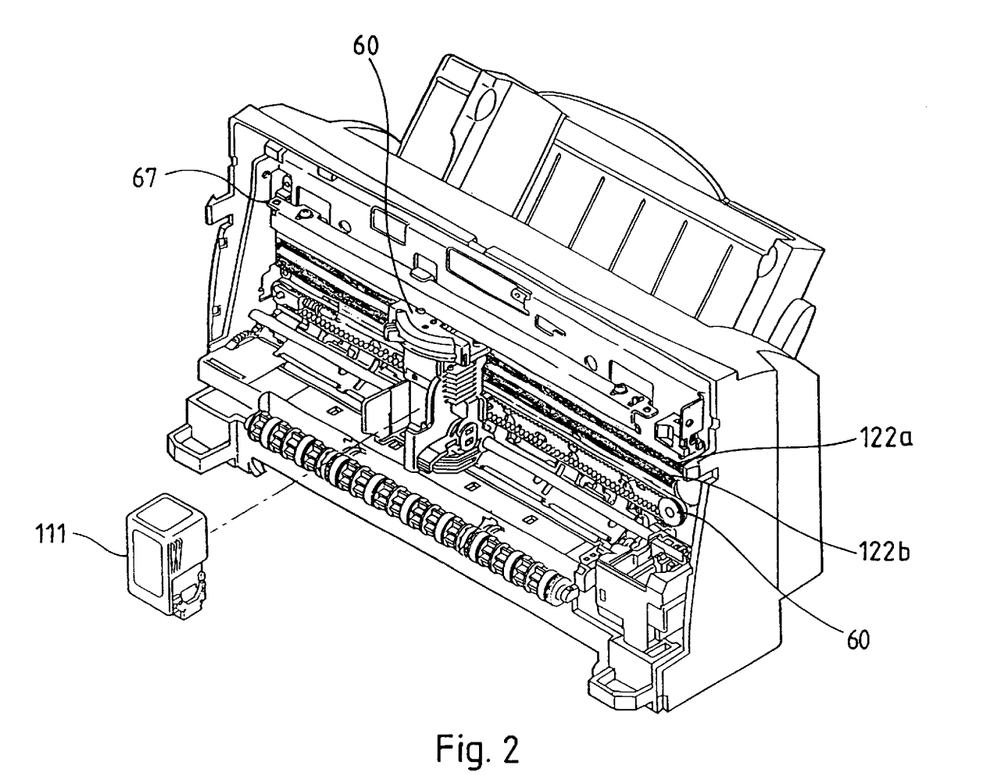
FIG. 2 is a simplified perspective view of the printing device.

The ink cartridge 111 is exchangeable and is mounted on a reciprocating carriage (reference 60 in FIG. 2) actuated by a motor 102, within a given range of movement (see FIG. 2).

The ink cartridge essentially comprises an ink reservoir 112, and a pipe 120 connecting the reservoir and print head 113. This print head 113 serves to transfer the ink to the printing medium.

The printer also has a main data processing circuit 100, associated with a read only memory 103 and with a random access memory 109. The read only memory 103 contains the operating programs for the main processing circuit 100, while the random access memory 109, associated with the ink ejection control circuit 110, temporarily stores the data DI received by means of the interface 103 and the data processed by the main processing circuit 100.

The main processing circuit 100 is connected to a display 104, on which the main processing circuit 100 controls the display of messages representing the operation of the printer. The main processing circuit 100 is connected to a keyboard 105, having at least one switch, by means of which the user can transmit operating commands to the printer.

The processing circuit 100 is also connected to the motor 102 by means of an amplification circuit 101. The motor 102 moves the carriage which carries the print cartridge 111. The motor 102 is for example a stepping motor. The printer described above is conventional and well known to persons skilled in the art. It will therefore not be detailed any further.

According to the invention, the printer has, between the control 110 and the head 113, two pairs of metallic plates 122a, 122b and 121a, 121b. The pair consisting of the plates 122a and 122b is fixed to the chassis and is disposed along the entire length of the path over which the carriage travels during printing. The second pair of plates 121a and 121b is fixed to the movable carriage and is placed opposite the first at a constant distance therefrom. The two pairs of plates and the spaces between them constitute two capacitors. It should be noted that the plate 122b is fixed alongside the plate 122a; the same applies to the plate 121b with respect to the plate 121a.

The printer comprises a coding means, here the circuit 114 supplemented by a clock 130, in order to supply the metallic elements 122a and 122b with an alternating signal representing information to be printed. This signal, whose frequency spectrum is known and adapted to the capacitive connection, is for example coded according to a coding of the Manchester type.

The printer also comprises a conversion means 115 able to convert and decode the information received by the plates 121a and 121b into information suitable for being used by the print head 113.

As is clear from FIG. 2, the printing device comprises, in a conventional fashion, a carriage 60 for carrying the print cartridge 111. The carriage is driven in a reciprocating movement on a movement path formed by guide rails 67 forming the rectilinear path of the carriage with respect to the chassis. The motor drives the carriage 60 by means of a belt device 63. The guide rails can, as proposed in the patent EP-07736847, serve to convey the power supplying the print head.

The movement path of the print head 113 is parallel to a line on a printing medium, not shown, such as a sheet of paper. Along the movement path (and therefore parallel to the guide rails 67) there are disposed the plates 122a and 122b each intended to provide a capacitive connection with the plates 121a and 121b. These plates have a width of approximately 15 mm and a length of around the maximum travel of the print carriage.

It should be noted that a larger number of plates (3, 4 etc) can be disposed so as to create a larger number of capacitive connections, some being able to transfer information from the printer to the carriage or vice versa. Any one connection can be bidirectional simultaneously, or bidirectional in alternation.

Figure 3:
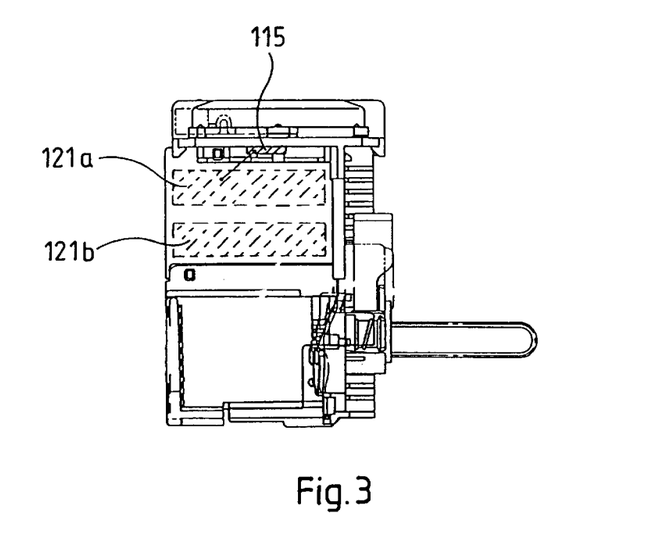
FIG. 3 is an elevation view of the movable carriage.

FIG. 3 depicts the movable carriage moving on the sweep path.

The metallic plates 121a and 121b are positioned so as to be parallel to the plates 122a and 122b at a distance less than 1 mm (for example equal to 0.5 mm). Each capacitor thus created will enable information to be routed between the carriage and the printer chassis, or vice versa.

The means 115 enables the information received by the plates 121a and 121b to be converted into data suitable for being used by the print head 113. The surface areas of the place are for example around 40 mm×20 mm.

Figure 4:
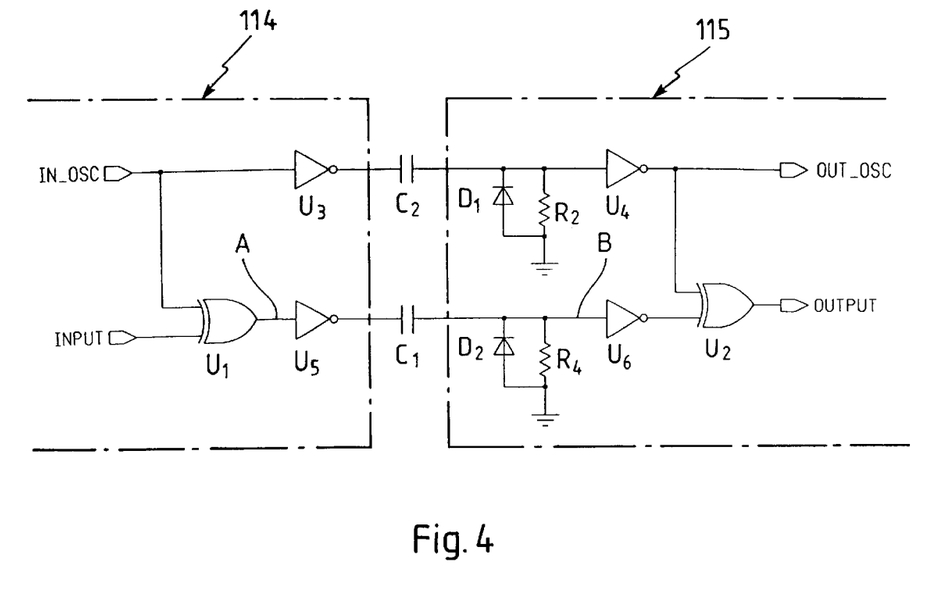
FIG. 4 depicts an equivalent electrical diagram of the capacitive transmission.

FIG. 4 depicts the equivalent electrical diagram of the capacitive transmission.

The logic element $U_1$. producing an exclusive OR and the inverting buffers $U_3$ and $U_5$ are integrated into the means 114.

$C_1$ represents the capacitance between the elements 121a and 122a. Its value is for example around 5 pF.

The capacitance $C_2$ represents the capacitance between the elements 121b and 122b. Its value is for example of the same order.

The diodes $D_1$, $D_2$ and the elements $U_4$, $U_6$, $U_2$ are components of the conversion means 115.

The use of an oscillator signal (referred to as IN-OSC) supplied by the clock 130 and of the signal called INPUT (containing the information to be transmitted) with a view to producing an exclusive OR makes it possible to perform a Manchester-type information coding of the output of $U_1$.

The advantage of this code is that it makes it possible to delimit the spectral size of the signal to be transmitted.

This is because, during the transmission of consecutive bits at the same level without any coding, the frequency of the transmitted signal is less than the passband, and information may then be lost.

In the example embodiment depicted, the clock signal and the information are transmitted at the same time, by means of the two capacitive connections, respectively.

However, it is entirely envisageable not to transmit the signal to the clock since this is contained in a Manchester-type coding. A single capacitive connection can therefore be sufficient.

This has nevertheless been carried out in order to reduce the complexity of the decoding means 115 reduced in the example under consideration to a few components.

The diodes $D_1$ and $D_2$ serve to restore a continuous component to the signal transmitted by $C_1$ and $C_2$.

The resistances $R_2$ and $R_4$ represent the parasitic resistances (input impedance of the means 115).

Their value must for example be greater than 100 kΩ. This is because, if the capacitor $C_1$ or $C_2$ discharges too quickly, through this resistance, the required potential could not be maintained, which would interfere with the system.

The information output signal, after decoding, is denoted OUTPUT, while the oscillator signal, transmitted by $C_1$ and which, after processing in $U_4$, is used for decoding, is referred to as OUT-OSC.

For a bidirectional transmission, it suffices to connect, in parallel to the branch $U_1+U_3+U_5$, a branch which is the reverse of the branch $U_2+U_4+U_6$ and, in parallel to the latter, a branch which is the reverse of the first branch. The transmitted signal then represents the data which the print head transmits to its control device.

Figure 5:
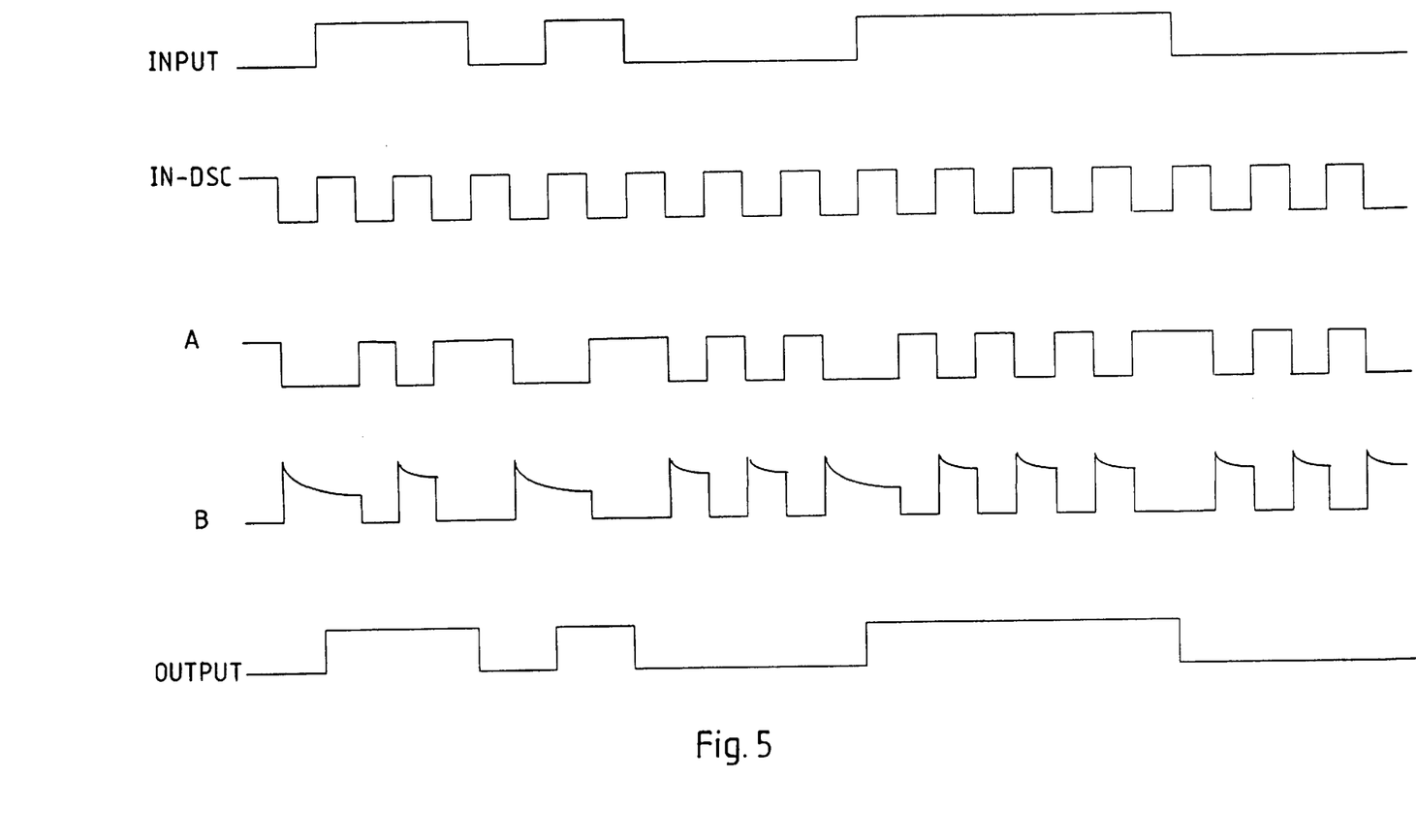
FIG. 5 depicts, as a timing diagram, an example of results obtained by the invention.

FIG. 5 depicts an example of results obtained by the invention: the changes over time of the different electrical signals mentioned above can be seen therein.

The signal INPUT represents the binary information to be transmitted to the print head.

This signal IN-OSC represents the clock signal (generated by the clock 130) transmitted to the print head. In the example under consideration, the clock is at 5 MHz.

These two signals are processed by a logic function called "EXCLUSIVE OR" with $U_1$ so as to produce an item of information coded in the form of a Manchester-type coding (signal A).

This signal is then transmitted by capacitive effect through $C_2$ to the print head.

The diode $D_2$ restores the continuous component of the transmitted signal. This conducts when the potential is negative, and this then has the result of imposing the potential of 0–0.6V as the minimum potential. This is represented at $U_6$ (signal B).

The only function of the inverter gates $U_3$, $U_4$, $U_5$ and $U_6$ is to amplify, shape and invert the signal.

Finally, the signal OUTPUT represents the output of the exclusive OR $U_2$: this signal is similar to the signal INPUT.

Figure 6:
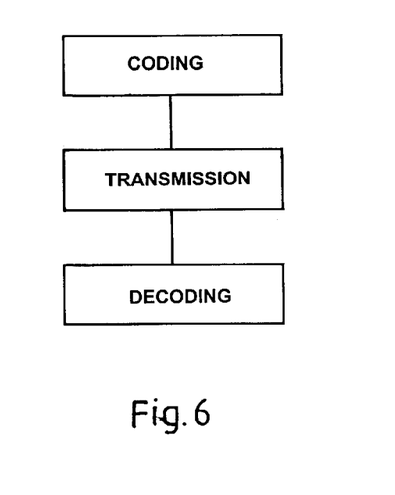
FIG. 6 is a flow diagram of the information transmission method.

FIG. 6 displays the three steps of the method according to the invention: coding in a form appropriate to the subsequent step, transmission by capacitive connection, and then decoding.

What is claimed is:

1. A method of transmitting binary information between a first device carried by a first body and a second device carried by a second body movable with respect to the first body along a path within a given range of movement, the method comprising the steps of:

providing at least one first electrically conductive main plate on the first body along the path of the second body and a second electrically conductive main plate on the second body so that the first and second main plates remain opposite each other, at a constant spacing between each other, when there is a relative movement of the second body with respect to the first body within the range of movement along the path, such that the first and second main plates form a main capacitor with a constant capacitance; and transmitting information from one of the first and second devices to the other by:

coding the information into at least one binary coded signal comprising a clock signal, transmitting the coded signal by applying the coded signal to one of the first and second main plates of the main capacitor, collecting a received signal at the other of the first and second main plates of the main capacitor, and decoding the received signal.

2. A method according to claim 1, wherein the information is transmitted from the first device to the second device.

3. A method according to claim 1, further comprising the steps of:

providing a first electrically conductive secondary plate on the first body along the path of the second body and a second electrically conductive secondary plate on the second body, so that the secondary plates remain opposite each other, at a constant spacing between each other, when there is a movement of the second body with respect to the first body within the range of movement along the path, such that the first and second secondary plates form a secondary capacitor with a constant capacitance; and transmitting, by means of the secondary capacitor, at least one other item of information from one of the first and second devices to the other.

4. A method according to claim 3, wherein the item of information comprises a clock signal having a frequency lying within a bandwidth of the secondary capacitor.

5. A method according to claim 4, wherein the main capacitor is designed so that its bandwidth contains the clock signal, and the clock signal is used for coding the information into a binary coded signal and for decoding the received signal.

6. A method according to claim 3, wherein the capacitance of the main capacitor and the capacitance of the secondary capacitor are substantially equal.

7. A method according to claim 1, wherein the step of coding the information uses a Manchester-type coding scheme.

8. A method according to claim 1, wherein the first and second bodies are located in a printing machine that comprises a chassis that includes the first body, a movable carriage that includes the second body, a movable print head on the second body connected to the second device, and a control device on the first body for controlling the print head and connected to the first device, and wherein the steps of coding, transmitting, and decoding are applied to printing information sent by the control device to the print head.

9. A method according to claim 8, wherein the steps of coding, transmitting, and decoding are further applied to information sent by the print head to the control device.

10. A mechanical device that includes a first body, a second body movable with respect to the first body along a path within a given range of movement, and a device for transmitting binary information, the mechanical device comprising:

a first electrical device carried by the first body and a second electrical device carried by the second body;

at least one first electrically conductive main plate carried by the first body along the path of the second body and connected to the first device, and a second electrically conductive main plate connected to the second device and carried by the second body so that the main plates remain opposite each other, at a constant spacing between each other, when there is a relative movement of the second body with respect to the first body within its range of movement along the path, such that the first and second main plates form a main capacitor with a constant capacitance;

a coding unit connected to one of the first and second devices and adapted to code information sent by one of the first and second devices into at least one binary coded signal;

a transmission unit adapted to transmit the coded signal by applying the coded signal to one of the first and second main plates of the main capacitor, and to collect a received signal at the other of the first and second main plates of the main capacitor; and a decoding unit connected to the other one of the first and second devices and adapted to decode the received signal, wherein the main capacitor is positioned between the coding unit and the decoding unit and serves as the transmission unit.

11. A mechanical device according to claim 10, wherein the coding unit is connected to the first device and the decoding unit is connected to the second device.

12. A mechanical device according to claim 10, further comprising:

a first electrically conductive secondary plate carried by the first body along the path of the second body and a second electrically conductive secondary plate carried by the second body so that the secondary plates remain opposite each other, at a constant spacing between each other, when there is a relative movement of the second body with respect to the first body within its range of movement along the path, such that the first and second secondary plates form a secondary capacitor with a constant capacitance; and a connector connecting the secondary capacitor to an information generator carried by one of the first and second bodies and to a user element carried by the other one of the first and second bodies.

13. A mechanical device according to claim 12, wherein the secondary capacitor is connected to a clock with a frequency lying within a bandwidth of the secondary capacitor.

14. A mechanical device according to claim 13, wherein the main capacitor is designed so as to have a bandwidth that contains the frequency of the clock, and the clock is connected to the coding unit, and, by means of the secondary capacitor, to the decoding unit.

15. A mechanical device according to claim 12, wherein the main capacitor and the secondary capacitor have substantially equal capacitances.

16. A mechanical device according to claim 10, wherein the coding unit and the decoding unit are designed so as to code and decode according to a Manchester-type coding scheme.

17. A mechanical device according to claim 10, wherein the first and second bodies are located in a printing machine comprising a chassis that includes the first body, a movable carriage that includes the second body, a movable print head on the carriage, and a control device for controlling the print head, the first device and the first main plate are fixed to the chassis of the printing machine, the first device is a control device for controlling the print head, the second device and the second main plate are fixed to the carriage of the printing machine, the second device is the print head, the coding unit is connected to the control device, and the decoding unit is connected to the print head.

18. A mechanical device according to claim 17, further comprising a coder connected to the print head and a decoder connected to the control device, wherein the coder and the decoder are connected together by the main capacitor.

19. A printing device that includes a chassis, a control device carried by the chassis, a carriage movable with respect to the chassis along a path within a given range of movement, a movable print head carried by the carriage, and a device for transmitting binary information, the printing device comprising:

at least one first electrically conductive main plate carried by the chassis along the path of the carriage and connected to the control device, and a second electrically conductive main plate connected to the print head and carried by the carriage so that the main plates remain opposite each other, at a constant spacing between each other, when there is a relative movement of the carriage with respect to the chassis within its range of movement along the path, such that the first and second main plates form a main capacitor with a constant capacitance;

a coding unit, connected to a device of a group consisting of the control device and the print head, adapted to code information sent by the printing device into at least one binary coded signal;

a transmission unit adapted to transmit the coded signal by applying the coded signal to one of the first and second main plates of the main capacitor, and to collect a received signal at the other of the first and second main plates of the main capacitor; and a decoding unit, connected to the other device of the group, adapted to decode the received signal, wherein the main capacitor is positioned between the coding unit and the decoding unit and serves as the transmission unit.

20. A printing device according to claim 19, wherein the coding unit is connected to the control device and the decoding unit is connected to the print head.

21. A printing device according to claim 19, further comprising:

a first electrically conductive secondary plate carried by the chassis along the path of the carriage and a second electrically conductive secondary plate carried by the carriage so that the secondary plates remain opposite each other, at a constant spacing between each other, when there is a relative movement of the carriage with respect to the chassis within its range of movement along the path, such that the first and second secondary plates form a secondary capacitor with a constant capacitance; and a connector connecting the secondary capacitor to a first element carried by the chassis and to a second element carried by the carriage.

22. A printing device according to claim 21, wherein the secondary capacitor is connected to a clock with a frequency lying within a bandwidth of the secondary capacitor.

23. A printing device according to claim 22, wherein the main capacitor is designed so as to have a bandwidth that contains the frequency of the clock, and the clock is connected to the coding unit, and, by means of the secondary capacitor, to the decoding unit.

24. A printing device according to claim 21, wherein the main capacitor and the secondary capacitor have substantially equal capacitances.

25. A printing device according to claim 19, wherein the coding unit and the decoding unit are designed so as to code and decode according to a Manchester-type coding scheme.

26. A printing device according to claim 19, further comprising a coder connected to the print head and a decoder connected to the control device, wherein the coder and the decoder are connected together by the main capacitor.

27. A method of transmitting binary information between a first device carried by a first body and a second device carried by a second body movable with respect to the first body along a path within a given range of movement, the method comprising the steps of:

providing at least one first electrically conductive main plate on the first body along the path of the second body and a second electrically conductive main plate on the second body so that the first and second main plates remain opposite each other, at a constant spacing between each other, when there is a relative movement of the second body with respect to the first body within the range of movement along the path, such that the first and second main plates form a main capacitor with a constant capacitance; and transmitting information from one of the first and second devices to the other by:
coding the information into at least one binary coded signal,
transmitting the coded signal by applying the coded signal to one of the first and second main plates of the main capacitor,
collecting a received signal at the other of the first and second main plates of the main capacitor, and
decoding the received signal;

providing a first electrically conductive secondary plate on the first body along the path of the second body and a second electrically conductive secondary plate on the second body, so that the secondary plates remain opposite each other, at a constant spacing between each other, when there is a movement of the second body with respect to the first body within the range of movement along the path, such that the first and second secondary plates form a secondary capacitor with a constant capacitance; and transmitting, by means of the secondary capacitor, at least one other item of information from one of the first and second devices to the other, wherein the item of information comprises a clock signal having a frequency lying within a bandwidth of the secondary capacitor.

28. A method according to claim 27, wherein the main capacitor is designed so that its bandwidth contains the clock signal, and the clock signal is used for coding the information into a binary coded signal and for decoding the received signal.

29. A method of transmitting binary information between a first device carried by a first body and a second device carried by a second body movable with respect to the first body along a path within a given range of movement, the method comprising the steps of:

providing at least one first electrically conductive main plate on the first body along the path of the second body and a second electrically conductive main plate on the second body so that the first and second main plates remain opposite each other, at a constant spacing between each other, when there is a relative movement of the second body with respect to the first body within the range of movement along the path, such that the first and second main plates form a main capacitor with a constant capacitance; and transmitting information from one of the first and second devices to the other by:
coding the information into at least one binary coded signal,
transmitting the coded signal by applying the coded signal to one of the first and second main plates of the main capacitor,
collecting a received signal at the other of the first and second main plates of the main capacitor, and
decoding the received signal, wherein the step of coding the information uses a Manchester-type coding scheme.

* * * * *

UNITED STATES PATENT AND TRADEMARK OFFICE
CERTIFICATE OF CORRECTION

PATENT NO. : 6,299,280 B1  
DATED : October 9, 2001  
INVENTOR(S) : Pascal Coudray et al.

It is certified that error appears in the above-identified patent and that said Letters Patent is hereby corrected as shown below:

<u>Title page,</u>  
Item [73], Assignee, "Canon Research Centre France S.A. (FR)" should read  
-- Canon Research Centre France S.A., Cesson Sevigne Cedex, France --.

Signed and Sealed this

Seventeenth Day of December, 2002

JAMES E. ROGAN  
*Director of the United States Patent and Trademark Office*